(12) United States Patent
Qiu et al.

(10) Patent No.: US 12,097,798 B2
(45) Date of Patent: Sep. 24, 2024

(54) DIMMING MECHANISM, VEHICLE LAMP MODULE, VEHICLE LAMP, AND VEHICLE

(71) Applicant: HASCO VISION TECHNOLOGY CO., LTD., Shanghai (CN)

(72) Inventors: Zhiping Qiu, Shanghai (CN); Langrun Jin, Shanghai (CN); Cong Li, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 49 days.

(21) Appl. No.: 17/926,326

(22) PCT Filed: Aug. 26, 2020

(86) PCT No.: PCT/CN2020/111397
§ 371 (c)(1),
(2) Date: Nov. 18, 2022

(87) PCT Pub. No.: WO2021/237961
PCT Pub. Date: Dec. 2, 2021

(65) Prior Publication Data
US 2023/0194061 A1 Jun. 22, 2023

(30) Foreign Application Priority Data
May 26, 2020 (CN) .......................... 202010456521.3

(51) Int. Cl.
*B60Q 1/00* (2006.01)
*B60Q 1/068* (2006.01)
(Continued)

(52) U.S. Cl.
CPC ............... *B60Q 1/14* (2013.01); *B60Q 1/068* (2013.01); *F21S 41/192* (2018.01);
(Continued)

(58) Field of Classification Search
CPC ........ F21S 41/192; F21S 41/657; F21S 45/47; B60Q 1/14; B60Q 1/068
See application file for complete search history.

(56) References Cited

U.S. PATENT DOCUMENTS 4,884,174 A 11/1989 Dorleans
6,637,919 B2 10/2003 Shirai
(Continued)

FOREIGN PATENT DOCUMENTS

CN 108302487 A 7/2018
CN 208983248 U 6/2019
(Continued)

OTHER PUBLICATIONS

Japanese Office Action issued on Oct. 13, 2023 for Japanese Patent Application No. 2022-570698.
(Continued)

*Primary Examiner* — Gerald J Sufleta, II
(74) *Attorney, Agent, or Firm* — Volpe Koenig

(57) ABSTRACT

A dimming mechanism, comprising a fixed ball head connecting piece having one end connected to a lighting unit and another end connected to a support frame or lamp body; a first adjustable ball head connecting piece having one end connected to the lighting unit such that the lighting unit rotates to achieve dimming in a first direction; and a second adjustable ball head connecting piece having one end slidingly connected to a sliding slot provided on the lighting unit so that by means of the front and back motion of the second adjustable ball head connecting piece, the sliding slot is driven to rotate, and the lighting unit is, by means of the rotation of the sliding slot, driven to rotate so as to achieve dimming in a second direction. Further disclosed are a vehicle lamp module comprising a dimming mechanism, a vehicle lamp, and a vehicle.

20 Claims, 10 Drawing Sheets

(51) Int. Cl.
*B60Q 1/14* (2006.01)
*F21S 41/19* (2018.01)
*F21S 41/657* (2018.01)
*F21S 45/47* (2018.01)
*F21W 102/00* (2018.01)

(52) U.S. Cl.
CPC ............. *F21S 41/657* (2018.01); *F21S 45/47* (2018.01); *F21W 2102/00* (2018.01)

(56) References Cited

U.S. PATENT DOCUMENTS

| | | | |
|---|---|---|---|
| 2017/0080847 A1* | 3/2017 | Zhang | F21V 17/10 |
| 2021/0001766 A1* | 1/2021 | Fletcher | F21S 41/151 |
| 2021/0221278 A1* | 7/2021 | Jackl | B60Q 1/076 |

FOREIGN PATENT DOCUMENTS

| | | |
|---|---|---|
| CN | 110006001 A | 7/2019 |
| CN | 209688728 U | 11/2019 |
| CN | 210050735 U | 2/2020 |
| CN | 210267077 U | 4/2020 |
| EP | 1157887 A2 | 11/2001 |
| EP | 1157887 A3 | 11/2001 |
| EP | 2551153 A1 | 1/2013 |
| EP | 3425265 A1 | 1/2019 |
| EP | 3470267 A1 | 4/2019 |
| EP | 3537031 A1 | 9/2019 |

OTHER PUBLICATIONS

Extended European Search Report issued on Jun. 30, 2023 for European Patent Application No. 20937604.5.

* cited by examiner

B-B

C-C

DIMMING MECHANISM, VEHICLE LAMP MODULE, VEHICLE LAMP, AND VEHICLE

CROSS REFERENCE TO RELATED APPLICATIONS

This application is a 35 USC § 371 National Stage application of International Patent Application No. PCT/CN2020/111397, which was filed Aug. 26, 2020, entitled "DIMMING MECHANISM, VEHICLE LAMP MODULE, VEHICLE LAMP, AND VEHICLE" and claims priority to Chinese Patent Application No. 202010456521.3 filed on May 26, 2020, which are incorporated by reference as if fully set forth.

FIELD OF INVENTION

The present disclosure relates to vehicle lamp components, in particular, to a dimming mechanism. In addition, the present disclosure also relates to a vehicle lamp module, a vehicle lamp, and a vehicle.

BACKGROUND

Before use or during installation of a vehicle lamp, especially a headlamp, its light shape needs to be calibrated to a standard position by dimming. Therefore, a vehicle lamp module needs to be provided with a dimming mechanism to adjust a projected light shape of a lighting unit relative to a light shape at a standard position (the light shape is a light shape projected on a standard screen, and the standard screen for the high beam or the low beam of a headlamp is a vertical screen 25 m in front of a vehicle) or adjust projected light shapes of lighting units by an angle in an up-down or left-right direction, as shown in FIG. 1 to FIG. 3, wherein P0 is the light shape at the standard position, P1, P2, P3 and P4 are light shapes at deviated positions, the light shape denoted by P1 needs downward dimming, the light shape denoted by P2 needs upward dimming, the light shape denoted by P3 needs rightward dimming, and the light shape denoted by P4 needs leftward dimming, to obtain the light shape P0 at the standard position.

As shown in FIGS. 4 to 7, a dimming mechanism used in a headlamp module at present includes three ball head screw assemblies 1, wherein each ball head screw assembly 1 includes a ball head screw 101 and a ball head nut 102, a shaft portion of the ball head screw 101 is provided with threads to achieve connection with a support frame or lamp body through the threads, and a front end of the ball head screw 101 is provided with a ball head which cooperates with the ball head nut 102 provided with a ball socket, and the ball head nut 102 is fixedly connected to a lighting unit 2. Among the three ball head screw assemblies 1, one ball head screw assembly 1 is provided as a fixed ball head screw assembly 1 relative to the support frame or lamp body, and the other two ball head screw assemblies 1 are provided as adjustable ball head screw assemblies 1 capable of moving forward and backward relative to the support frame or lamp body; one of the two adjustable ball head screw assemblies 1 is arranged below the fixed ball head screw assembly 1, and by rotating the ball head screw 101 of the adjustable ball head screw assembly 1, the ball head screw 101 moves forward and backward relative to the support frame or lamp body, causing the lighting unit 2 to rotate upward and downward relative to the support frame or lamp body about a horizontal dimming axis, to achieve dimming in the up-down direction; and the other adjustable ball head screw assembly 1 is arranged on the left or right side of the fixed ball head screw assembly 1, and by rotating the ball head screw 101 of the adjustable ball head screw assembly 1, the ball head screw 101 moves forward and backward relative to the support frame or lamp body, causing the lighting unit 2 to rotate leftward and rightward relative to the support frame or lamp body about a vertical dimming axis, to achieve dimming in the left-right direction. The horizontal dimming axis is a horizontal axis formed by a connecting the center of a ball head of the adjustable ball head screw assembly 1 located on the left or right side of the fixed ball head screw assembly 1 and the center of a ball head of the fixed ball head screw assembly 1, and the vertical dimming axis is a vertical axis formed by a connecting the center of a ball head of the adjustable ball head screw assembly 1 located below the fixed ball head screw assembly 1 and the center of the ball head of the fixed ball head screw assembly 1.

Although the above dimming mechanism can achieve dimming in the up-down and left-right directions, it still has at least two shortcomings: first, to achieve up-down and left-right dimming, the adjustable ball head screw assembly 1 needs to be arranged on a side of or below the fixed ball head screw assembly 1, making an overall size a of the dimming mechanism in the up-down or left-right direction (as shown in FIG. 7) larger, which is not adapted to the space layout requirement of the vehicle lamp module with an increasingly smaller size in the up-down or left-right direction; and second, if the size of the vehicle lamp module in the up-down or left-right direction is smaller, a distance L between two ball head screw assemblies 1 in the up-down direction or between two ball head screw assemblies 1 in the left-right direction is shorter, such that a moment arm for rotation is shorter, and a slight forward or backward movement of the adjustable ball head screw assembly 1 causes the lighting unit 2 to rotate a large angle, so that the dimming precision is lower.

SUMMARY

A technical problem to be solved by the present disclosure in a first aspect is to provide a dimming mechanism capable of implementing the miniaturization of the size of a vehicle lamp module in a second direction and improving the dimming precision in the second direction.

A technical problem to be solved by the present disclosure in a second aspect is to provide a vehicle lamp module, a dimming mechanism of which is capable of implementing the miniaturization of the size of the vehicle lamp module in a second direction and improving the dimming precision in the second direction.

A technical problem to be solved by the present disclosure in a third aspect is to provide a vehicle lamp, a dimming mechanism of which is capable of implementing the miniaturization of the size of a vehicle lamp module in a second direction and improving the dimming precision in the second direction.

A technical problem to be solved by the present disclosure in a fourth aspect is to provide a vehicle, a dimming mechanism of which is capable of implementing the miniaturization of the size of a vehicle lamp module in a second direction and improving the dimming precision in the second direction.

To solve the above technical problems, in the first aspect, the present disclosure provides a dimming mechanism for dimming a lighting unit, which includes a fixed ball head connecting piece, a first adjustable ball head connecting piece and a second adjustable ball head connecting piece, wherein the fixed ball head connecting piece is connected to the lighting unit at one end and connected to a support frame or lamp body at the other end; the first adjustable ball head connecting piece is connected to the lighting unit at one end and is supported on the support frame or lamp body at the other end, and the first adjustable ball head connecting piece is capable of moving forward and backward relative to the support frame or lamp body to drive the lighting unit to rotate to achieve dimming in a first direction; and the lighting unit is provided with a sliding slot, and the second adjustable ball head connecting piece is slidably connected to the sliding slot, at one end and is supported on the support frame or lamp body at the other end, and the second adjustable ball head connecting piece is capable of moving forward and backward relative to the support frame or lamp body to drive the sliding slot to rotate and drive the lighting unit to rotate through the rotation of the sliding slot to achieve dimming in a second direction.

As a preferred embodiment of the present disclosure, a connecting line between the center of a ball head of the fixed ball head connecting piece and the center of a ball head of the first adjustable ball head connecting piece extends in the first direction, and the second adjustable ball head connecting piece is arranged behind the fixed ball head connecting piece and the first adjustable ball head connecting piece.

More preferably, the first direction is an up-down direction, and the second direction is a left-right direction; and the center of the ball head of the fixed ball head connecting piece, the center of the ball head of the first adjustable ball head connecting piece and the center of a ball head of the second adjustable ball head connecting piece are placed in a same vertical plane.

Further preferably, an included angle is formed between the sliding slot and the vertical plane.

As another preferred embodiment of the present disclosure, the first direction is a left-right direction, and the second direction is an up-down direction; and the center of the ball head of the fixed ball head connecting piece, the center of the ball head of the first adjustable ball head connecting piece and the center of the ball head of the second adjustable ball head connecting piece are placed in a same horizontal plane.

More preferably, an included angle is formed between the sliding slot and the horizontal plane.

As yet another preferred embodiment of the present disclosure, the fixed ball head connecting piece and the first adjustable ball head connecting piece are both ball head screw assemblies, and each of the ball head screw assemblies includes a ball head screw and a ball head nut.

As a specific structural form of the present disclosure, a sliding slot is formed in the lighting unit, and a slider is arranged on the sliding slot, and one end of the second adjustable ball head connecting piece is slidably connected to the sliding slot by means of the slider.

More preferably, the second adjustable ball head connecting piece is a ball head screw assembly, the ball head screw assembly includes a ball head screw and a ball head nut, the slider includes a slider base slidably connected to the sliding slot and a fixed part fixed on the slider base, the fixed part may be movably connected to the ball head of the second adjustable ball head connecting piece; or the slider is formed as a sliding bar connected to the ball head nut, and the slider may be slidably connected in the sliding slot.

Particularly, the fixed part is formed as an annular structure, and a clamping groove is formed in the second adjustable ball head connecting piece, the ball head nut of the second adjustable ball head connecting piece is clamped on the fixed part by means of the clamping groove, and the center of the ball head of the second adjustable ball head connecting piece is arranged on an axial center line of the annular structure; or a cylindrical slot is formed in the fixed part, the ball head of the second adjustable ball head connecting piece is mounted in the cylindrical slot in a matching manner and can slide along the cylindrical slot.

As another specific structural form of the present disclosure, an axial center line of the cylindrical slot is perpendicular to the vertical plane passing through the center of the ball head of the fixed ball head connecting piece and the center of the ball head of the second adjustable ball head connecting piece, wherein an inner surface of the cylindrical slot is formed by stretching an intersecting line between the ball head of the second adjustable ball head connecting piece and the vertical plane along the axial center line; or the axial center line of the cylindrical slot is formed as an arc segment with the center of the ball head of the fixed ball head connecting piece as a circle center and a connecting line between the center of the ball head of the fixed ball head connecting piece and the center of the ball head of the second adjustable ball head connecting piece as a radius, wherein the inner surface of the cylindrical slot is formed by stretching the intersecting line between the ball head of the second adjustable ball head connecting piece and the vertical plane along the axial center line, the vertical plane is a vertical plane passing through the center of the ball head of the fixed ball head connecting piece and the center of the ball head of the second adjustable ball head connecting piece.

More specifically, an elastic support structure is arranged on or integrally formed on one end surface, away from the fixed part, of the slider base, and the elastic support structure abuts against a bottom surface of the sliding slot and is capable of generating an opposite acting force to enable the slider base to fit tightly against the sliding slot and slide along the sliding slot.

Further, the elastic support structure is a pair of arc elastic sheets which extend in a direction of the sliding slot.

In the second aspect, the present disclosure provides a vehicle lamp module which includes the dimming mechanism according to any technical solution of the first aspect described above and a lighting unit.

Preferably, the lighting unit includes a heat sink, and a sliding slot is integrally or detachably formed in the heat sink.

In the third aspect, the present disclosure provides a vehicle lamp which includes the vehicle lamp module according to the technical solution of the second aspect described above.

In the fourth aspect, the present disclosure provides a vehicle which includes the vehicle lamp according to the technical solution of the third aspect described above.

By the above technical solutions, in the dimming mechanism of the present disclosure, the forward and backward movement of the first adjustable ball head connecting piece causes the lighting unit to rotate to achieve dimming in the first direction, and the forward and backward movement of the second adjustable ball head connecting piece causes the sliding slot and the lighting unit to rotate to achieve dimming in the second direction. In this dimming mechanism, the second adjustable ball head connecting piece does not need to be arranged on a side of the fixed ball head connecting piece in the second direction, so that a size a' of the lighting unit in the second direction can be reduced, and the miniaturization of the lighting unit in the second direction is achieved. Moreover, as the second adjustable ball head connecting piece is arranged behind the fixed ball head connecting piece and the first adjustable ball head connecting piece, a distance between the center of the ball head of the second adjustable ball head connecting piece and a second rotation axis may be increased, that is, a moment arm for the lighting unit rotating in the second direction is increased, and compared with the prior art, for a same moving distance of the second adjustable ball head connecting piece, the dimming mechanism provided in the present disclosure achieves a slighter rotation of the lighting unit in the second direction, and thus has higher dimming precision in the second direction.

Other advantages of the present disclosure and technical effects of the preferred embodiments will be further described in the following specific embodiments.

BRIEF DESCRIPTION OF THE SYMBOLS

| | |
|---|---|
| 1 Ball head screw assembly | 101 Ball head screw |
| 102 Ball head nut | 1a Fixed ball head connecting piece |
| 1b First adjustable ball head connecting piece | 1c Second adjustable ball head connecting piece |
| 2 Lighting unit | 201 Heat sink |
| 3 Support frame or lamp body | 4 Sliding slot |
| 5 Lens | 6 Slider |
| 601 Slider base | 6011 Sliding part |
| 6012 Elastic support structure | 602 Fixed part |
| 6021 Cylindrical slot | 6022 Axial center line |
| 6023 Boss | |

DETAILED DESCRIPTION OF THE EMBODIMENTS

Specific embodiments of the present disclosure are described below in detail in conjunction with the accompanying drawings. It should be understood that the specific embodiments described here are only used for illustrating and explaining the present disclosure, and the protection scope of the present disclosure is not limited to the following specific embodiments.

In the description of the present disclosure, it should be noted that the terms "connection" and "link" should be interpreted in a broad sense unless otherwise clearly specified and defined. For example, it may be a fixed connection, a detachable connection, or an integral connection; it may be a direct connection, or an indirect connection through an intermediate medium, and it may also be a communication within two elements or an interaction relationship between two elements. For those of ordinary skill in the art, the specific meanings of the above terms in the present disclosure may be understood according to specific circumstances.

Figure 1:
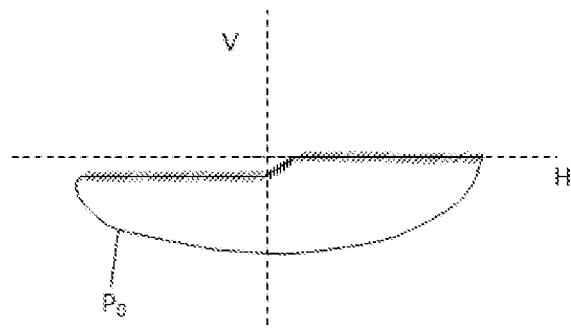
FIG. 1 is a standard light shape diagram at a standard position.
Figure 2:
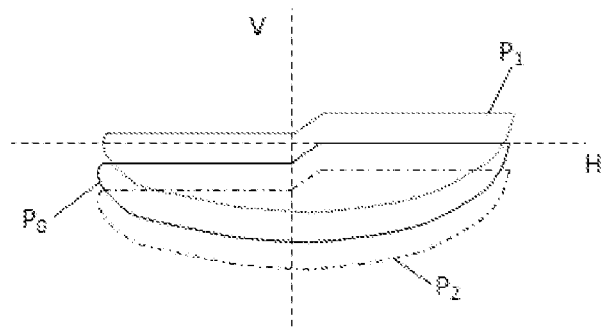
FIG. 2 is a light shape diagram with up and down deviations.
Figure 3:
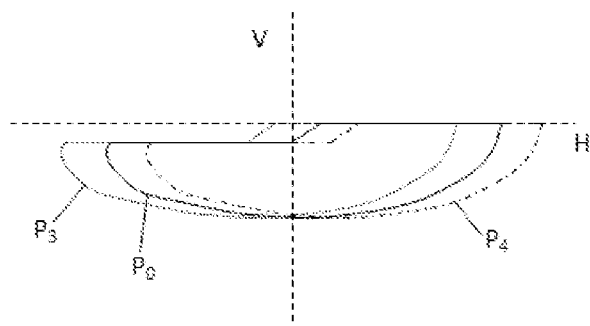
FIG. 3 is a light shape diagram with left and right deviations.
Figure 4:
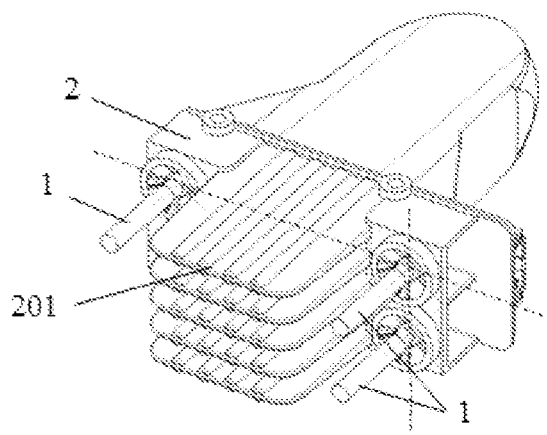
FIG. 4 is a structural schematic diagram I of a vehicle lamp module in the prior art.
Figure 5:
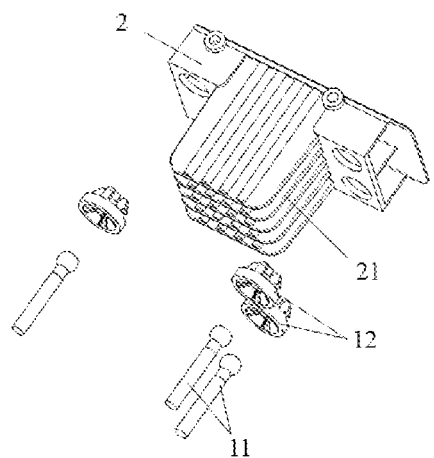
FIG. 5 is an exploded view of FIG. 4.
Figure 6:
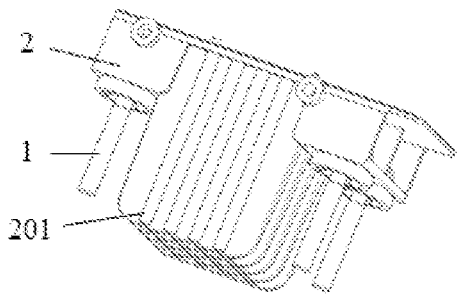
FIG. 6 is a structural schematic diagram II of the vehicle lamp module in the prior art.
Figure 7:
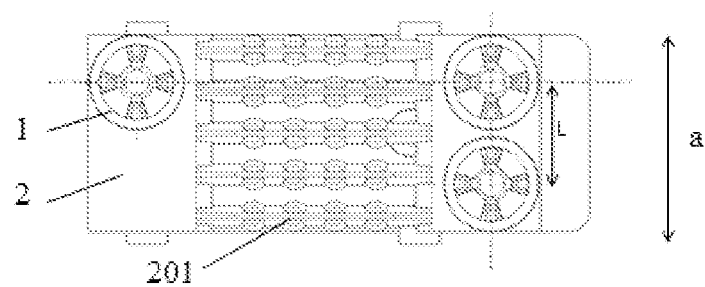
FIG. 7 is a structural schematic diagram III of the vehicle lamp module in the prior art.
Figure 8:
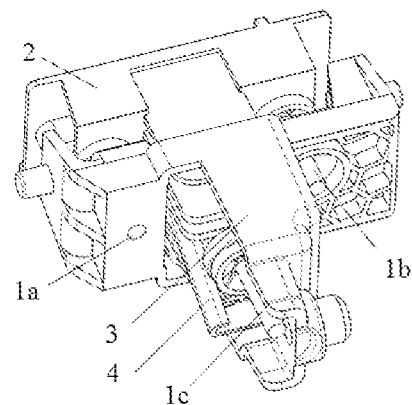
FIG. 8 is a three-dimensional structural schematic diagram I of a first specific embodiment of a dimming mechanism of the present disclosure, showing a support frame or lamp body.

It should be understood that, as shown in FIG. 4, based on a vehicle lamp module, the term "front" refers to a direction of a light emergent direction, "rear" refers to a direction opposite to the "front", "left" refers to a left side in the light emergent direction, "right" refers to a right side in the light emergent direction, "up" refers to an upper side of the light emergent direction, and "down" refers to a lower side of the light emergent direction. Based on direction or positional relationships illustrated in the accompanying drawings, the terms are only intended to facilitate describing the present disclosure and simplify description, instead of indicating or implying that the denoted devices or elements necessarily have specific orientations and are constructed and operated in specific orientations, and thus cannot be understood as limiting the present disclosure.

Figure 39:
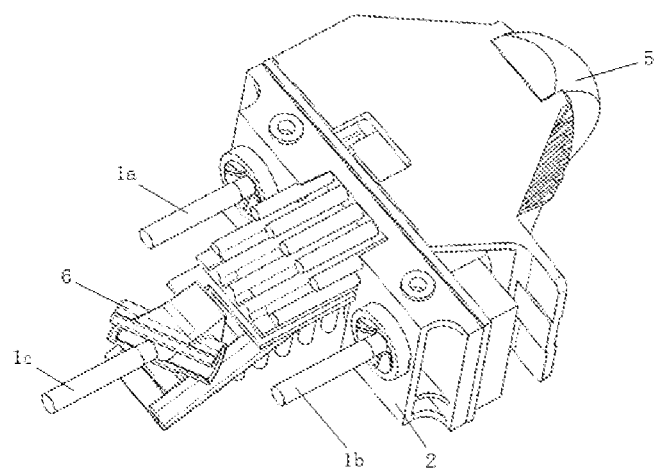
FIG. 39 is a structural schematic diagram of a vehicle lamp module of the present disclosure.

Furthermore, it should be noted that a theoretical design state of a dimming mechanism is that the positional relationship between components of the dimming mechanism of the present disclosure is based on a lighting unit that does not require up-down and left-right dimming. For example, in the lighting unit shown in FIG. 39, the positional relationships between the components are designed based on a state when an optical axis of a lens 5 is parallel to a front-rear direction of a vehicle, including an included angle between a sliding slot 4 and a horizontal plane or a sliding slot 4 and a vertical plane, and the geometric relationship between an axial center line of a cylindrical slot 6021 and the centers of ball heads of two ball head screws 101, and after the vehicle lamp module is mounted on a vehicle lamp, the above positional relationships will change when dimming is performed due to manufacturing tolerances or assembly tolerances. Of course, the dimming mechanism is not only applicable to a lighting unit 2 with the lens 5, but also applicable to other lighting units, such as lighting units with reflective optical elements.

In a basic embodiment of the present disclosure, as shown in FIGS. 8 to 18 and FIGS. 26 to 32, a dimming mechanism is provided for dimming a lighting unit 2, which includes a fixed ball head connecting piece 1a, a first adjustable ball head connecting piece 1b and a second adjustable ball head connecting piece 1c, wherein the fixed ball head connecting piece 1a is connected to the lighting unit 2 at one end and to a support frame or lamp body 3 at the other end; the first adjustable ball head connecting piece 1b is connected to the lighting unit 2 at one end and is supported on the support frame or lamp body 3 at the other end, and the first adjustable ball head connecting piece 1b is capable of moving forward and backward relative to the support frame or lamp body 3 to drive the lighting unit 2 to rotate to achieve dimming in a first direction; and the lighting unit 2 is provided with a sliding slot 4, and the second adjustable ball head connecting piece 1c is slidably connected to the sliding slot 4 at one end and is supported on the support frame or lamp body 3 at the other end, and the second adjustable ball head connecting piece 1c is capable of moving forward and backward relative to the support frame or lamp body 3 to drive the sliding slot 4 to rotate and drive the lighting unit 2 to rotate through the rotation of the sliding slot 4 to achieve dimming in a second direction.

It should be noted here that the first direction may be set to any direction, such as a left-right direction, an up-down direction or other directions; the second direction may also be set to any direction, but the first direction and the second direction need to be set to two different directions. Preferably, the first direction and the second direction are perpendicular to each other to achieve more accurate adjustment of the position of a light shape. An example in which the first direction and the second direction are perpendicular to each other is used below for further explanation and description.

Specifically, the first adjustable ball head connecting piece 1b and the second adjustable ball head connecting piece 1c may be ball head screw assemblies 1, or may also be rods with ball head structures. The fixed ball head connecting piece 1a may be any ball head connecting piece that can achieve fixed connection between the support frame or lamp body 3 and the lighting unit 2 and does not affect the rotation between the fixed ball head connecting piece 1a and the lighting unit 2, or may also be a ball head screw assembly 1 like the first adjustable ball head connecting piece 1b or the second adjustable ball head connecting piece 1c or a rod with a ball head structure. The ball head screw assembly 1 includes a ball head screw 101 and a ball head nut 102. In the case of the rod with the ball head structure, the ball head screw 101 of the ball head screw assembly 1 is replaced with a rod that has no thread. When the first adjustable ball head connecting piece 1b and the second adjustable ball head connecting piece 1c are the ball head screw assemblies 1, the support frame or lamp body 3 is provided with two holes suitable for passage of the ball head screws 101 of the ball head screw assemblies 1, and the two holes are internally provided with internal threads adaptive to external threads of the ball head screws 101. During operation, the ball head screws 101 are rotated to cause the ball head screw assemblies 1 to move forward and backward, thereby driving the lighting unit 2 to rotate. When the first adjustable ball head connecting piece 1b and the second adjustable ball head connecting piece 1c are the rods with the ball head structures, the support frame or lamp body 3 is provided with two holes suitable for insertion of the rods of the first adjustable ball head connecting piece 1b and the second adjustable ball head connecting piece 1c, and the holes are set to a size that does not affect sliding of the first adjustable ball head connecting piece 1b or the second adjustable ball head connecting piece 1c inside the holes in the front-rear direction. During operation, the rods with the ball head structures are controlled to slide forward and backward, thereby driving the lighting unit 2 to rotate. Of course, the first adjustable ball head connecting piece 1b and the second adjustable ball head connecting piece 1c may also be telescopic rods with ball head structures, that is, the ball head screws 101 of the ball head screw assemblies 1 are replaced with telescopic rods which can be fixedly connected to the support frame or lamp body 3, and the telescopic rods extend and retract to drive the lighting unit 2 to rotate. Preferably, the first adjustable ball head connecting piece 1b and the second adjustable ball head connecting piece 1c are the ball head screw assemblies 1, and may be adjusted slightly to achieve higher precision.

The sliding slot 4 is removably or integrally connected to the lighting unit 2. Preferably, the sliding slot 4 is integrally connected to the lighting unit 2, so that installation steps of the vehicle lamp may be reduced.

Figure 37:
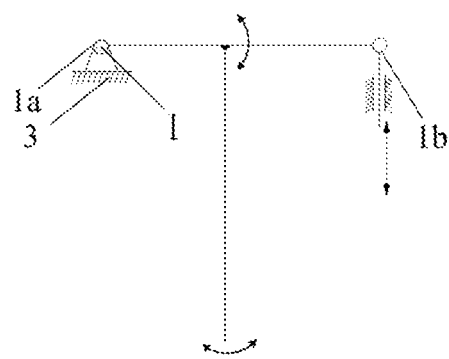
FIG. 37 is a principle diagram of dimming in a left-right direction of the dimming mechanism of FIG. 8.
Figure 38:
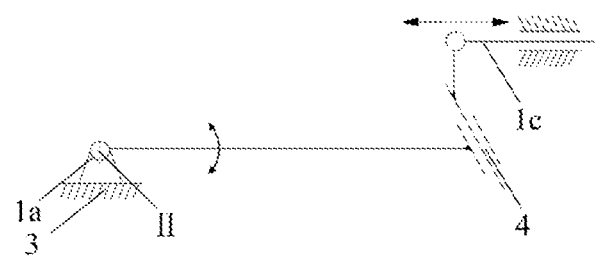
FIG. 38 is a principle diagram of dimming in an up-down direction of the dimming mechanism of FIG. 8.

In operation of the dimming mechanism provided in the above basic embodiment, using the fixed ball head connecting piece 1a, the first adjustable ball head connecting piece 1b and the second adjustable ball head connecting piece 1c being the ball head screw assemblies 1 as an example, when dimming is required in the first direction, the ball head of the ball head screw 101 and the ball head nut 102 matched with the ball head in the fixed ball head connecting piece 1a form a revolving pair structure, and the ball head of the ball head screw 101 and the ball head nut 102 matched with the ball head in the fixed ball head connecting piece 1b form a revolving pair structure, and the forward and backward movement of the first adjustable ball head connecting piece 1b causes the lighting unit 2 to rotate about a first rotation axis I which is a straight line that passes through the center of the ball head of the fixed ball head connecting piece 1a and is perpendicular to the first direction, so that the light shape of the lighting unit 2 moves in the first direction, as shown in FIG. 37. When dimming is required in the second direction, the ball head of the ball head screw 101 and the ball head nut 102 matched with the ball head in the fixed ball head connecting piece 1a form a revolving pair structure; the ball head of the ball head screw 101 and the ball head nut 102 matched with the ball head in the first adjustable ball head connecting piece 1b form a revolving pair structure; and the ball head of the ball head screw 101 and the ball head nut 102 matched with the ball head in the second adjustable ball head connecting piece 1c form a revolving pair structure, and the forward and backward movement of the second adjustable ball head connecting piece 1c causes the sliding slot 4 to rotate about a second rotation axis II which is a connecting line between the center of the ball head of the fixed ball head connecting piece 1a and the center of the ball head of the first adjustable ball head connecting piece 1b, thereby causing the lighting unit 2 to rotate, so that the light shape of the lighting unit 2 moves in the second direction, as shown in FIG. 38.

Specifically, the connecting line between the center of the ball head of the fixed ball head connecting piece 1a and the center of the ball head of the first adjustable ball head connecting piece 1b, i.e., the second rotation axis II, extends in the first direction, and the second adjustable ball head connecting piece 1c is arranged behind the fixed ball head connecting piece 1a and the first adjustable ball head connecting piece 1b, to be able to reduce a size a' of the lighting unit 2 in the second direction and increase a distance L' between the center of the ball head of the second adjustable ball head connecting piece 1c and the second rotation axis II, to achieve the miniaturization of the lighting unit 2 in the second direction and the dimming precision.

Figure 12:
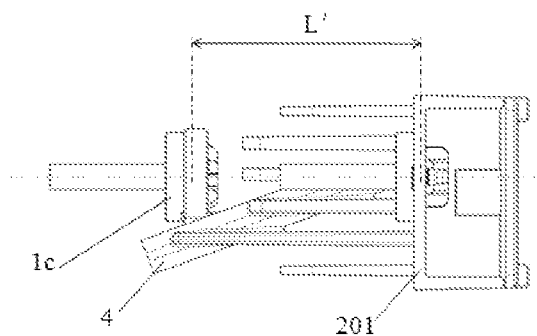
FIG. 12 is a side view of FIG. 9.

In operation of the dimming mechanism provided in the above basic embodiment, the forward and backward movement of the first adjustable ball head connecting piece 1b drives the lighting unit 2 to rotate to achieve dimming in the first direction, and the forward and backward movement of the second adjustable ball head connecting piece 1c drives the sliding slot 4 and the lighting unit 2 to rotate to achieve dimming in the second direction. In this dimming mechanism, the second adjustable ball head connecting piece 1c does not need to be arranged on a side of the fixed ball head connecting piece 1a in the second direction, so that the size a' of the lighting unit 2 in the second direction can be reduced, and the miniaturization of the lighting unit 2 in the second direction is achieved. Moreover, as the second adjustable ball head connecting piece 1c is arranged behind the fixed ball head connecting piece 1a and the first adjustable ball head connecting piece 1b, the distance L' between the center of the ball head of the second adjustable ball head connecting piece 1c and the second rotation axis II may be increased, that is, a moment arm for the lighting unit 2 rotating in the second direction is increased, as shown in FIG. 12, and compared with the prior art, for a same moving distance of the second adjustable ball head connecting piece 1c, the dimming mechanism provided in the present disclosure achieves slighter rotation of the lighting unit 2 in the second direction, and thus has higher dimming precision in the second direction.

In order to improve the dimming precision in the first direction, in a specific embodiment of the present disclosure, the first adjustable ball head connecting piece 1b is arranged at an end, away from the fixed ball head connecting piece 1a, of the lighting unit 2. By arranging the first adjustable ball head connecting piece 1b at the end, away from the fixed ball head connecting piece 1a, of the lighting unit 2, a moment arm for the rotation of the lighting unit 2 during dimming in the first direction may be increased, so that the angle of rotation of the lighting unit 2 is smaller for a same moving distance of the first adjustable ball head connecting piece 1b, thus improving the dimming precision.

In a specific embodiment of the present disclosure, the first direction is the up-down direction and the second direction is the left-right direction; and the center of the ball head of the fixed ball head connecting piece 1a, the center of the ball head of the first adjustable ball head connecting piece 1b and the center of the ball head of the second adjustable ball head connecting piece 1c are placed in the same vertical plane, which can reduce components generated in the left-right direction when dimming is performed in the up-down direction. According to this specific embodiment, the size of the lighting unit 2 in the left-right direction can be reduced and the miniaturization of the vehicle lamp module in the left-right direction can be achieved.

In order to drive the sliding slot 4 to rotate by the forward and backward movement of the second adjustable ball head connecting piece 1c to achieve dimming in the left-right direction of the lighting unit 2, in a specific embodiment of the present disclosure, the included angle formed between the sliding slot 4 and the above vertical plane may be 0°-90°, preferably 15°-60°. Specifically, the included angle may be set specifically by those skilled in the art based on actual use and installation. Similarly, the included angle between the sliding slot 4 and the vertical plane also refers to an included angle between the sliding slot 4 and the vertical plane in the theoretical design state, and when dimming is performed in the up-down and left-right directions, the sliding slot 4 swings, and the included angle also changes.

Figure 11:
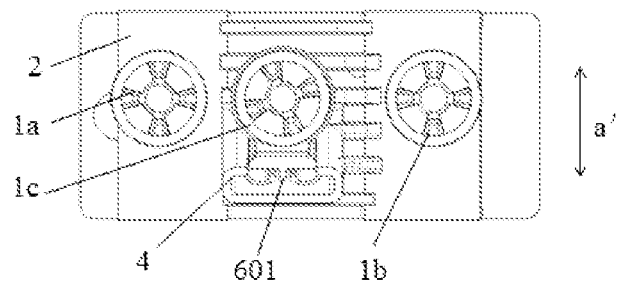
FIG. 11 is a rear view of FIG. 9.

In a specific embodiment of the present disclosure, the first direction is the left-right direction and the second direction is the up-down direction. As shown in FIG. 11, the center of the ball head of the fixed ball head connecting piece 1a, the center of the ball head of the first adjustable ball head connecting piece 1b and the center of the ball head of the second adjustable ball head connecting piece 1c are placed in the same horizontal plane, which can reduce components generated in the up-down direction when dimming is performed in the left-right direction. According to this specific embodiment, the size of the lighting unit 2 in the up-down direction can be reduced and the miniaturization of the vehicle lamp module in the up-down direction can be achieved.

In order to drive the sliding slot 4 to rotate by the forward and backward movement of the second adjustable ball head connecting piece 1c to achieve dimming in the up-down direction of the lighting unit 2, in a specific embodiment of the present disclosure, the included angle formed between the sliding slot 4 and the above horizontal plane may be 0°-90°, preferably 15°-60°. Specifically, the included angle may be set specifically by those skilled in the art based on actual use and installation. Similarly, the included angle between the sliding slot 4 and the horizontal plane also refers to an included angle between the sliding slot 4 and the horizontal plane in the theoretical design state, and when dimming is performed in the up-down and left-right directions, the sliding slot 4 swings, and the included angle also changes.

Figure 13:
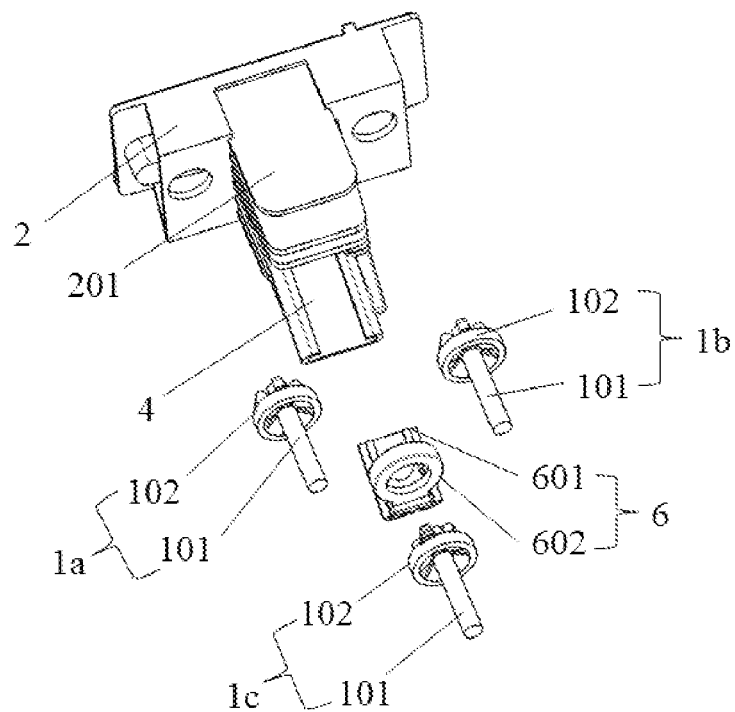
FIG. 13 is an exploded view of FIG. 9.
Figure 17:
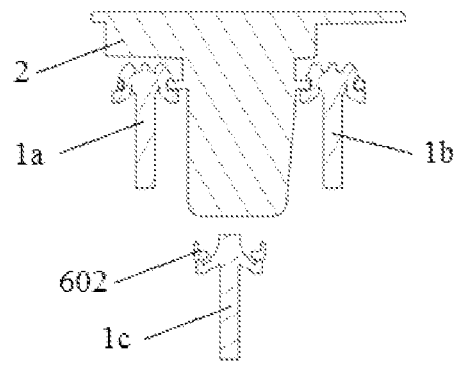
FIG. 17 is a schematic diagram of a section B-B of FIG. 16.
Figure 18:
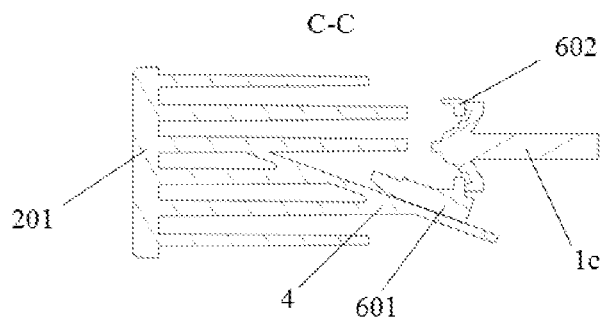
FIG. 18 is a schematic diagram of a section C-C of FIG. 16.
Figure 19:
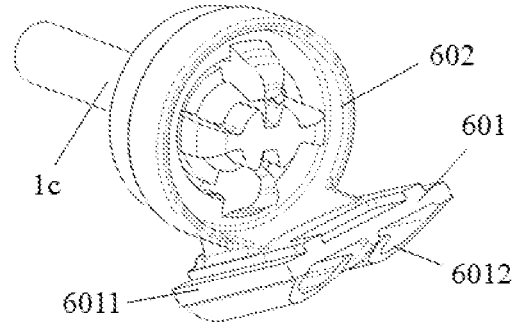
FIG. 19 is a structural schematic diagram I of a first specific embodiment of a second adjustable ball head connecting piece and a slider of the present disclosure.
Figure 20:
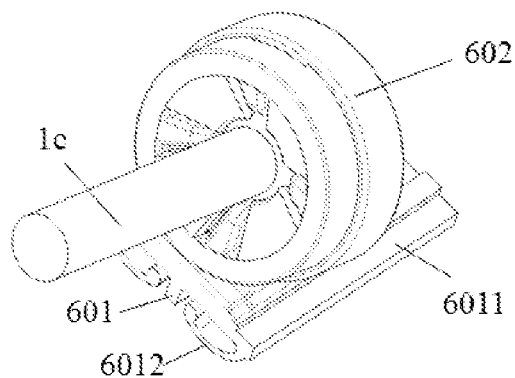
FIG. 20 is a structural schematic diagram II of the first specific embodiment of the second adjustable ball head connecting piece and the slider of the present disclosure.
Figure 21:
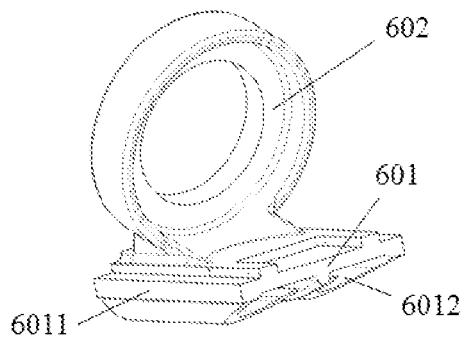
FIG. 21 is a structural schematic diagram I of a first specific embodiment of the slider of the present disclosure.
Figure 22:
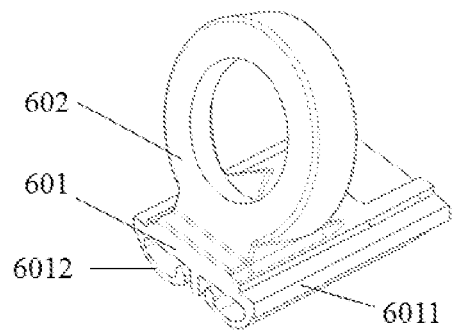
FIG. 22 is a structural schematic diagram II of the first specific embodiment of the slider of the present disclosure.
Figure 23:
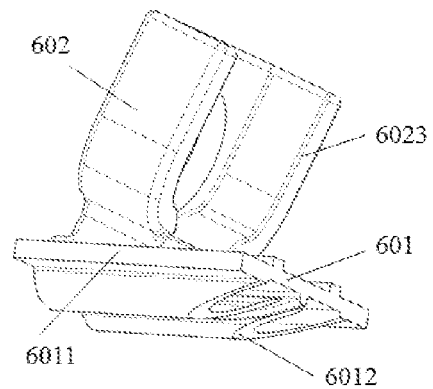
FIG. 23 is a structural schematic diagram I of a second specific embodiment of the slider of the present disclosure.
Figure 24:
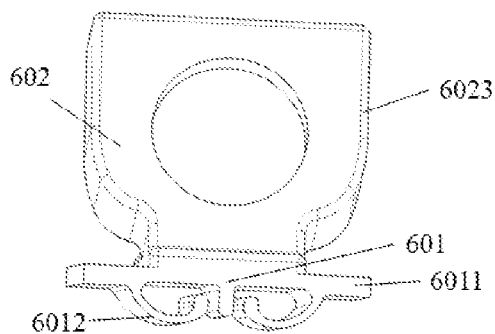
FIG. 24 is a structural schematic diagram II of the second specific embodiment of the slider of the present disclosure.
Figure 25:
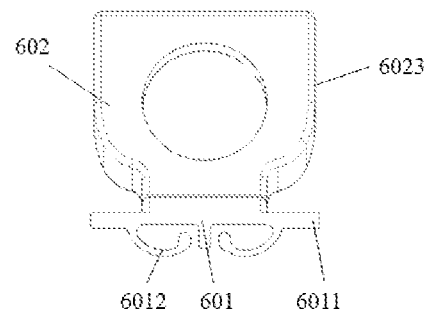
FIG. 25 is a structural schematic diagram III of the second specific embodiment of the slider of the present disclosure.
Figure 26:
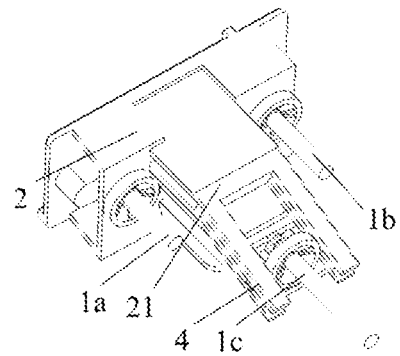
FIG. 26 is a structural schematic diagram I of a second specific embodiment of the dimming mechanism of the present disclosure.
Figure 27:
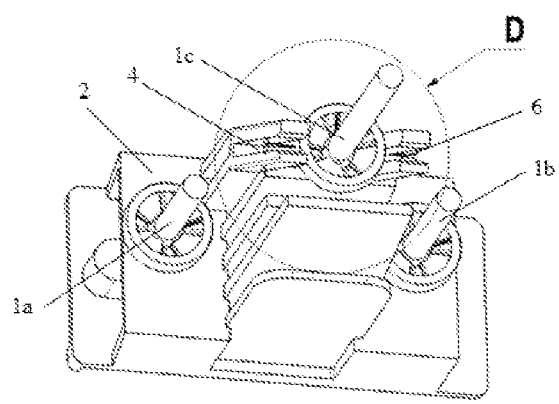
FIG. 27 is a structural schematic diagram II of the second specific embodiment of the dimming mechanism of the present disclosure.
Figure 28:
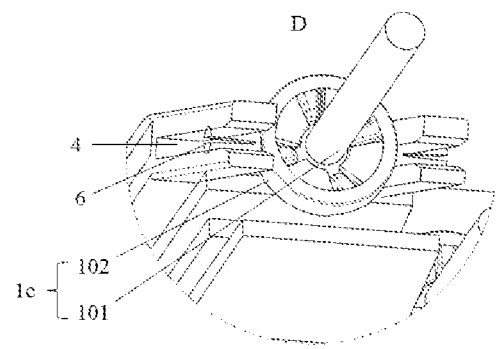
FIG. 28 is an enlarged diagram of a part D in FIG. 27.

In a specific embodiment of the present disclosure, as shown in FIGS. 13, 17 and 18, the fixed ball head connecting piece 1a, the first adjustable ball head connecting piece 1b and the second adjustable ball head connecting piece 1c are ball head screw assemblies 1, and each of the ball head screw assemblies 1 includes a ball head screw 101 and a ball head nut 102; and a slider 6 that can be slidably connected to the sliding slot 4 is arranged on the sliding slot 4, and includes a slider base 601 slidably connected to the sliding slot 4 and a fixed part 602 fixed on the slider base 601, and the ball head nut 102 of the second adjustable ball head connecting piece 1c is connected to the fixed part 602 in a clamped manner. Specifically, the fixed part 602 may be of an annular structure, and the ball head nut 102 of the second adjustable ball head connecting piece 1c is provided with a clamping groove, and the ball head nut 102 of the second adjustable ball head connecting piece 1c is clamped on the fixed part 602 by the clamping groove to prevent relative sliding of the second adjustable ball head connecting piece 1c on the fixed part 602, and the slider base 601 suitable for sliding in the sliding slot 4 is arranged on an outer side of the fixed part 602.

Figure 9:
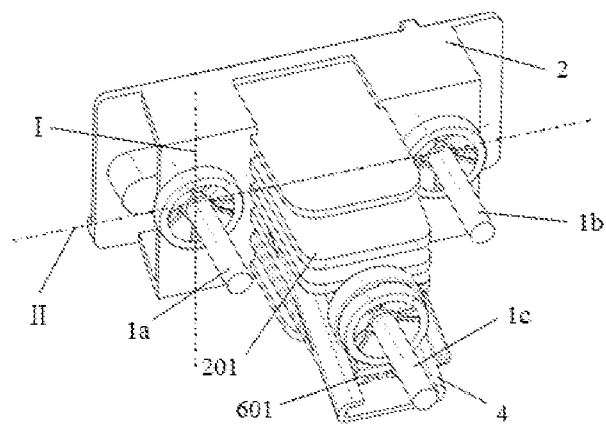
FIG. 9 is a three-dimensional structural schematic diagram II of the first specific embodiment of the dimming mechanism of the present disclosure.
Figure 10:
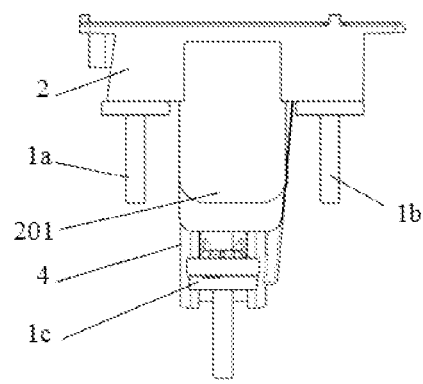
FIG. 10 is a top view of FIG. 9.

During the forward and backward movement of the second adjustable ball head connecting piece 1c, the second adjustable ball head connecting piece 1c drives the fixed part 602 to move, thereby driving the slider 6 to move forward and backward and slide in the sliding slot 4. As the sliding slot 4 is set obliquely relative to a plane where the center of the ball head of the fixed ball head connecting piece 1a, the center of the ball head of the first adjustable ball head connecting piece 1b and the center of the ball head of the second adjustable ball head connecting piece 1c are located, the forward and backward movement of the slider 6 causes the sliding slot 4 and the lighting unit 2 to rotate about the second rotation axis II which is the connecting line between the center of the ball head of the fixed ball head connecting piece 1a and the center of the ball head of the first adjustable ball head connecting piece 1b, thereby achieving dimming in the second direction. For example, when the second direction is the left-right direction, the lighting unit 2 rotates about the second rotation axis II, thereby achieving dimming in the left-right direction; and as shown in FIG. 9, when the second direction is the up-down direction, the lighting unit 2 rotates about the second rotation axis II, thereby achieving dimming in the up-down direction.

Figure 14:
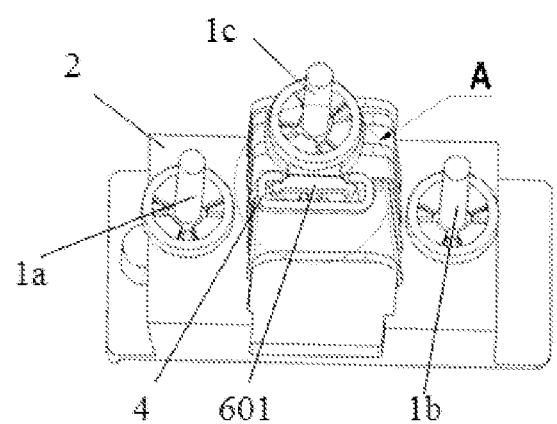
FIG. 14 is a three-dimensional structural schematic diagram III of the first specific embodiment of the dimming mechanism of the present disclosure.
Figure 15:
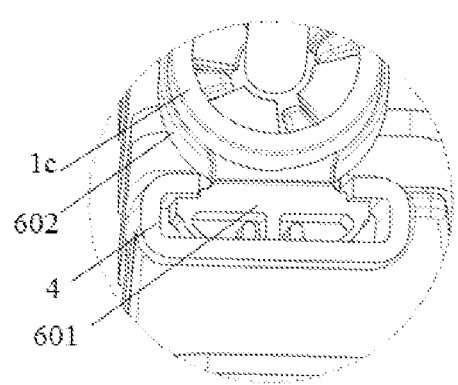
FIG. 15 is an enlarged diagram of a part A in FIG. 14.
Figure 16:
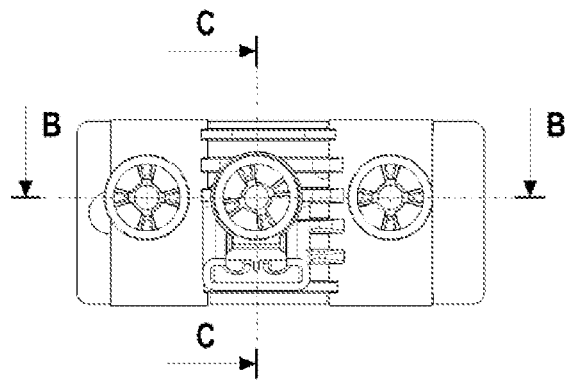
FIG. 16 is a rear view of FIG. 9.

During dimming in the first direction, by rotating the first adjustable ball head connecting piece 1b, the first adjustable ball head connecting piece 1b moves forward and backward relative to the support frame or lamp body 3, driving the lighting unit 2 to rotate in the first direction about the straight line that passes through the center of the ball head of the fixed ball head connecting piece 1a and is perpendicular to the first direction, to achieve dimming in the first direction. At this time, the lighting unit 2 rotates in the first direction relative to the support frame or lamp body 3, and as the sliding slot 4 is integrally formed in the lighting unit 2, and the second adjustable ball head connecting piece 1c and the slider 6 are fixed relative to the support frame or lamp body 3, the sliding slot 4 rotates in the first direction relative to the slider 6, and thus, there is a gap between the sliding slot 4 and the slider 6 in the first direction to enable the sliding slot 4 and the slider 6 to move relative to each other. For example, as shown in FIGS. 14 and 15, when the first direction is the left-right direction, there are gaps between the sliding slot 4 and the slider 6 on both left and right sides; and for another example, when the first direction is the up-down direction, there are gaps between the sliding slot 4 and the slider 6 on both upper and lower sides.

In another specific embodiment of the present disclosure, as shown in FIGS. 26 to 30, the fixed ball head connecting piece 1a, the first adjustable ball head connecting piece 1b and the second adjustable ball head connecting piece 1c are ball head screw assemblies 1, and each of the ball head screw assemblies 1 includes a ball head screw 101 and a ball head nut 102; and a slider 6 is arranged on the ball head nut 102 of the second adjustable ball head connecting piece 1c, and is arranged in the sliding slot 4. Preferably, the slider 6 is integrally arranged on the ball head nut 102.

Specifically, the sliding slot 4 here may be a gap that is formed by two rod-like structures, and suitable for clamping the slider 6, and an end, away from the ball head nut 102, of the slider 6 is provided with an opening which can make the slider 6 more elastic to facilitate better insertion of the slider 6 into the sliding slot 4, and enables the slider 6 to be better fixed in the sliding slot 4, so that the relative positions of the slider 6 and the sliding slot 4 are fixed when no dimming operation is performed to maintain the stability of the projected light shape of the lighting unit 2.

In the above two specific embodiments, as the sliding slot 4 and the slider 6 cooperate in a bevel contact manner, when in relative movement of the sliding slot 4 relative to the slider 6 in the first direction, movement in the second direction is also produced, i.e., the slider 6 moves slightly forward and backward relative to the sliding slot 4, such that the lighting unit 2 also rotates slightly in the second direction. Therefore, when dimming is required, priority is given to dimming in the first direction, and then dimming in the second direction, because when dimming is performed in the first direction, the lighting unit 2 also rotates slightly in the second direction, and if dimming is performed in the second direction first, and dimming is performed in the first direction after the projected light shape of the lighting unit 2 in the second direction reaches a standard position, the projected light shape in the second direction deviates from the standard position due to the slight rotation of the lighting unit 2, thus reducing the dimming precision in the second direction. Meanwhile, when dimming is performed in the first direction, a stress is generated between the ball head screw 101 and the ball head nut 102 of the second adjustable ball head connecting piece 1c.

Figure 31:
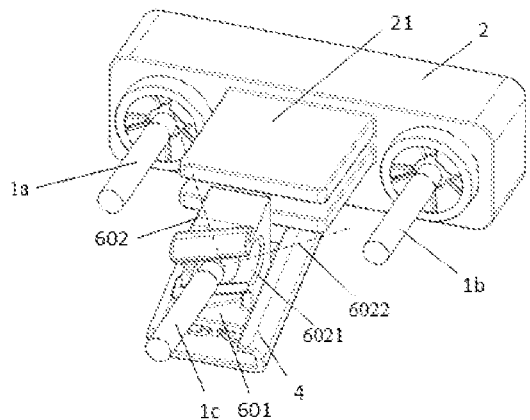
FIG. 31 is a structural schematic diagram I of a third specific embodiment of the dimming mechanism of the present disclosure.
Figure 32:
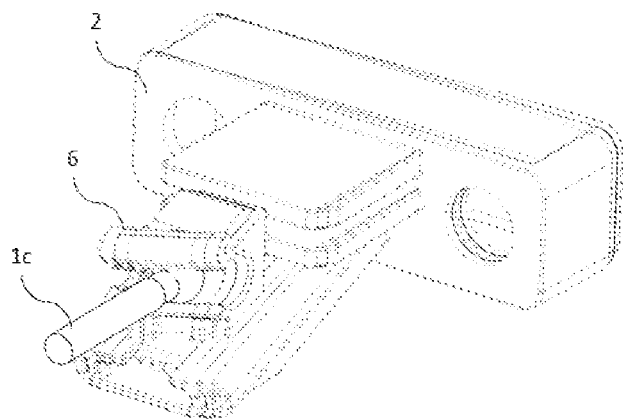
FIG. 32 is a schematic diagram of left-right dimming of the dimming mechanism of FIG. 31.
Figure 33:
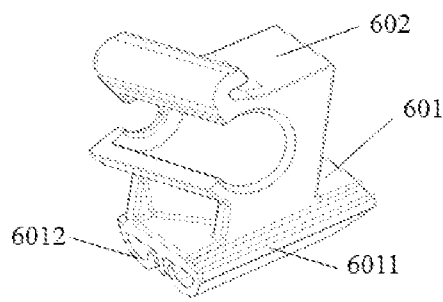
FIG. 33 is a structural schematic diagram I of a third specific embodiment of the slider of the present disclosure.
Figure 34:
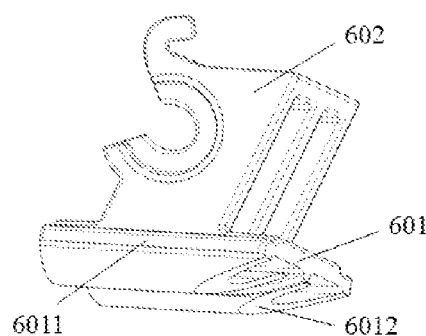
FIG. 34 is a structural schematic diagram II of the third specific embodiment of the slider of the present disclosure.
Figure 35:
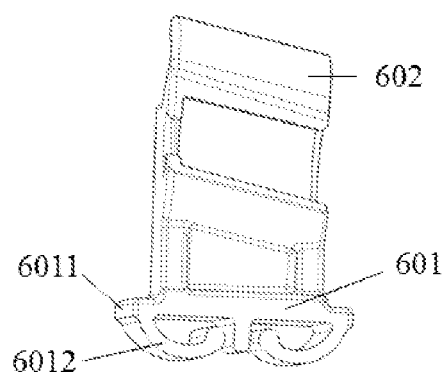
FIG. 35 is a structural schematic diagram III of the third specific embodiment of the slider of the present disclosure.
Figure 36:
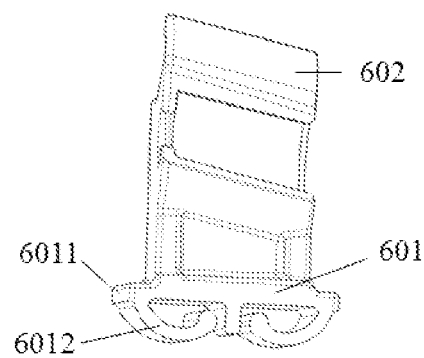
FIG. 36 is a structural diagram IV of the third specific embodiment of the slider of the present disclosure.

When dimming is performed in the first direction, to reduce the slight rotation of the second lighting unit 2 in the second direction and the stress between the ball head screw 101 and the ball head nut 102 of the second adjustable ball head connecting piece 1c, as another specific embodiment of the present disclosure, as shown in FIGS. 31 and 32, the fixed ball head connecting piece 1a and the first adjustable ball head connecting piece 1b are ball head screw assemblies 1, and each of the ball head screw assemblies 1 includes a ball head screw 101 and a ball head nut 102; the second adjustable ball head connecting piece 1c is provided as a ball head screw 101; and a slider 6 that can be slidably connected to the sliding slot 4 is arranged on the sliding slot 4, and includes a slider base 601 slidably connected to the sliding slot 4 and a fixed part 602 fixed on the slider base 601, the fixed part 602 is provided with a cylindrical slot 6021 capable of cooperating with the ball head of the second adjustable ball head connecting piece 1c, and the ball head of the second adjustable ball head connecting piece 1c is capable of sliding relatively along the cylindrical slot 6021. When dimming is performed in the first direction, the lighting unit 2 rotates in the first direction relative to the support frame or lamp body 3, and as the sliding slot 4 is integrally formed in the lighting unit 2, and the ball head of the second adjustable ball head connecting piece 1c is slidably connected to the slider 6 by the cylindrical slot 6021, and the second adjustable ball head connecting piece 1c is fixed relative to the support frame or lamp body 3, the slider 6 rotates together with the sliding slot 4 in the first direction, while the ball head of the second adjustable ball head connecting piece 1c does not move, thus the slider 6 cannot produce slight forward and backward movement or just produces extremely slight forward and backward movement relative to the sliding slot 4, reducing the slight rotation of the lighting unit 2 in the second direction. Meanwhile, as the second adjustable ball head connecting piece 1c is only slidably connected to the slider 6 through the cooperation of the ball head of the ball head screw 101 and the cylindrical slot 6021, the stress between parts is reduced. Preferably, the center of the ball head of the second adjustable ball head connecting piece 1c is arranged on an axial center line 6022 of the cylindrical slot 6021.

During the forward and backward movement of the second adjustable ball head connecting piece 1c, the second adjustable ball head connecting piece 1c drives the slider 6 to move forward and backward and slide in the sliding slot 4. To enable the sliding slot 4 to adapt to the sliding of the slider 6, the sliding slot 4 is set obliquely relative to a plane where the center of the ball head of the fixed ball head connecting piece 1a, the center of the ball head of the first adjustable ball head connecting piece 1b and the center of the ball head of the second adjustable ball head connecting piece 1c are located, so that the forward and backward movement of the slider 6 causes the sliding slot 4 and the lighting unit 2 to rotate about the second rotation axis II which is the connecting line between the center of the ball head of the fixed ball head connecting piece 1a and the center of the ball head of the first adjustable ball head connecting piece 1b, thereby achieving dimming in the second direction. For example, when the second direction is the left-right direction, the lighting unit 2 rotates about the second rotation axis II, thereby achieving dimming in the left-right direction; and when the second direction is the up-down direction, the lighting unit 2 rotates about the second rotation axis II, thereby achieving dimming in the up-down direction.

In a relatively preferred embodiment of the present disclosure, using the first direction being the left-right direction as an example, as shown in FIGS. 8 to 18, the dimming mechanism includes a fixed ball head connecting piece 1a, a first adjustable ball head connecting piece 1b and a second adjustable ball head connecting piece 1c, wherein the first adjustable ball head connecting piece 1b and the fixed ball head connecting piece 1a are arranged at left and right ends of a lighting unit 2, and a connecting line between the centers of ball heads of the two connecting pieces is a horizontal line; the fixed ball head connecting piece 1a is connected to the lighting unit 2 at one end and connected to a support frame or lamp body 3 at the other end; the first adjustable ball head connecting piece 1b is connected to the lighting unit 2 at one end and is supported on the support frame or lamp body 3 at the other end, and the first adjustable ball head connecting piece 1b is capable of moving forward and backward relative to the support frame or lamp body 3; the lighting unit 2 is provided with a sliding slot 4, and a slider 6 that can be slidably connected to the sliding slot 4 is arranged on the sliding slot 4, and includes a slider base 601 slidably connected to the sliding slot 4 and a fixed part 602 fixed on the slider base 601; one end of the second adjustable ball head connecting piece 1c is connected to the fixed part 602 in a clamped manner, there are gaps formed between the sliding slot 4 and the slider 6 on both left and right sides, and the other end of the second adjustable ball head connecting piece 1c is supported on the support frame or lamp body 3, and the second adjustable ball head connecting piece 1c is capable of moving forward and backward relative to the support frame or lamp body 3; and the center of the ball head of the fixed ball head connecting piece 1a, the center of the ball head of the first adjustable ball head connecting piece 1b, and the center of the ball head of the second adjustable ball head connecting piece 1c are placed in a same horizontal plane, and an included angle is formed between the sliding slot 4 and the horizontal plane.

In operation of the dimming mechanism provided in the above preferred embodiment, the first adjustable ball head connecting piece 1b, the second adjustable ball head connecting piece 1c and the fixed ball head connecting piece 1a are connected with the support frame or lamp body 3 by threads, and the support frame or lamp body 3 is used as a fixing component when dimming is performed. During dimming in the left-right direction, by rotating the first adjustable ball head connecting piece 1b, the first adjustable ball head connecting piece 1b moves forward and backward relative to the support frame or lamp body 3, driving the lighting unit 2 to rotate about the first rotation axis I, to achieve dimming in the left-right direction. At this time, the lighting unit 2 rotates to the left and right relative to the support frame or lamp body 3, and as the sliding slot 4 is integrally formed in the lighting unit 2, and the second adjustable ball head connecting piece 1c and the slider 6 are fixed relative to the support frame or lamp body 3, the sliding slot 4 rotates to the left and right relative to the slider 6, thus, there is a gap between the sliding slot 4 and the slider 6 in the left-right direction to enable the sliding slot 4 and the slider 6 to move relative to each other. Meanwhile, as the sliding slot 4 and the slider 6 cooperate in a bevel contact manner, when the sliding slot 4 may produce the left-right movement relative to the slider 6, movement in the up-down direction is also produced, and thus the lighting unit 2 also rotates slightly in the up-down direction. During dimming in the up-down direction, by rotating the second adjustable ball head connecting piece 1c, the second adjustable ball head connecting piece 1c moves forward and backward relative to the support frame or lamp body 3, and the slider 6 moves forward and backward in the sliding slot 4 inclined upward, such that the sliding slot 4 rotates about the second rotation axis II, driving the lighting unit 2 to rotate about the second rotation axis II, to achieve dimming in the up-down direction. If the second adjustable ball head connecting piece 1c moves forward, the lighting unit 2 rotates upward, and if the second adjustable ball head connecting piece 1c moves backward, the lighting unit 2 rotates downward.

In another relatively preferred embodiment of the present disclosure, using the first direction being the left-right direction as an example, as shown in FIGS. 26 to 30, the dimming mechanism includes a fixed ball head connecting piece 1a, a first adjustable ball head connecting piece 1b and a second adjustable ball head connecting piece 1c, wherein the first adjustable ball head connecting piece 1b and the fixed ball head connecting piece 1a are arranged at left and right ends of a lighting unit 2, and a connecting line between the centers of ball heads of the two connecting pieces is a horizontal line; the fixed ball head connecting piece 1a is connected to the lighting unit 2 at one end and connected to a support frame or lamp body 3 at the other end; the first adjustable ball head connecting piece 1b is connected to the lighting unit 2 at one end and is supported on the support frame or lamp body 3 at the other end, and the first adjustable ball head connecting piece 1*b* is capable of moving forward and backward relative to the support frame or lamp body 3; the lighting unit 2 is provided with a sliding slot 4, and the fixed ball head connecting piece 1*a*, the first adjustable ball head connecting piece 1*b* and the second adjustable ball head connecting piece 1*c* are ball head screw assemblies 1, and each of the ball head screw assemblies 1 includes a ball head screw 101 and a ball head nut 102; a slider 6 is arranged on the ball head nut 102 of the second adjustable ball head connecting piece 1*c*, and the slider 6 is arranged in the sliding slot 4; the second adjustable ball head connecting piece 1*c* is supported on the support frame or lamp body 3, and is capable of moving forward and backward relative to the support frame or lamp body 3; and the center of the ball head of the fixed ball head connecting piece 1*a*, the center of the ball head of the first adjustable ball head connecting piece 1*b*, and the center of the ball head of the second adjustable ball head connecting piece 1*c* are placed in a same horizontal plane, and an included angle is formed between the sliding slot 4 and the horizontal plane.

In yet another relatively preferred embodiment of the present disclosure, as shown in FIGS. 31 and 32, using the first direction being the left-right direction as an example, the dimming mechanism includes a fixed ball head connecting piece 1*a*, a first adjustable ball head connecting piece 1*b* and a second adjustable ball head connecting piece 1*c*, wherein the first adjustable ball head connecting piece 1*b* and the fixed ball head connecting piece 1*a* are arranged at left and right ends of the lighting unit 2, and a connecting line between the centers of ball heads of the two connecting pieces is a horizontal line; the fixed ball head connecting piece 1*a* is connected to the lighting unit 2 at one end and connected to a support frame or lamp body 3 at the other end; the first adjustable ball head connecting piece 1*b* is connected to the lighting unit 2 at one end and is supported on the support frame or lamp body 3 at the other end, and the first adjustable ball head connecting piece 1*b* is capable of moving forward and backward relative to the support frame or lamp body 3; the fixed ball head connecting piece 1*a* and the first adjustable ball head connecting piece 1*b* are both ball head screw assemblies 1, and each of the ball head screw assemblies 1 includes a ball head screw 101 and a ball head nut 102; the second adjustable ball head connecting piece 1*c* only includes a ball head screw 101; and the lighting unit 2 is provided with a sliding slot 4, and a slider 6 that can be slidably connected to the sliding slot 4 is arranged on the sliding slot 4, and includes a slider base 601 slidably connected to the sliding slot 4 and a fixed part 602 fixed on the slider base 601, the fixed part 602 is provided with a cylindrical slot 6021 capable of cooperating with a ball head of the second adjustable ball head connecting piece 1*c*, and the ball head of the second adjustable ball head connecting piece 1*c* being capable of sliding relatively along the cylindrical slot 6021. The second adjustable ball head connecting piece 1*c* is supported on the support frame or lamp body 3, and is capable of moving forward and backward relative to the support frame or lamp body 3; and the center of the ball head of the fixed ball head connecting piece 1*a*, the center of the ball head of the first adjustable ball head connecting piece 1*b*, and the center of the ball head of the second adjustable ball head connecting piece 1*c* are placed in a same horizontal plane, and an included angle is formed between the sliding slot 4 and the horizontal plane. During dimming in the left-right direction, by rotating the first adjustable ball head connecting piece 1*b*, the first adjustable ball head connecting piece 1*b* moves forward and backward relative to the support frame or lamp body 3, driving the lighting unit 2 to rotate about the first rotation axis I. At this time, the lighting unit 2 rotates to the left and right relative to the support frame or lamp body 3, to achieve dimming in the left-right direction. During dimming in the up-down direction, by rotating the second adjustable ball head connecting piece 1*c*, the second adjustable ball head connecting piece 1*c* moves forward and backward relative to the support frame or lamp body 3, and the slider 6 moves forward and backward in the sliding slot 4 inclined upward, such that the sliding slot 4 rotates about the second rotation axis II, driving the lighting unit 2 to rotate about the second rotation axis II, to achieve dimming in the up-down direction. If the second adjustable ball head connecting piece 1*c* moves forward, the lighting unit 2 rotates upward, and if the second adjustable ball head connecting piece 1*c* moves backward, the lighting unit 2 rotates downward.

In the dimming mechanism provided in the above three preferred embodiments, the forward and backward movement of the first adjustable ball head connecting piece 1*b* drives the lighting unit 2 to rotate to achieve dimming in the left-right direction, and the forward and backward movement of the second adjustable ball head connecting piece 1*c* drives the sliding slot 4 to rotate in the up-down direction to cause the lighting unit 2 to rotate in the up-down direction, thus achieving dimming in the up-down direction. In this dimming mechanism, the second adjustable ball head connecting piece 1*c* does not need to be arranged on a side of the fixed ball head connecting piece 1*a* in the up-down direction, so that the size a' of the lighting unit 2 in the up-down direction can be reduced, and the miniaturization of the vehicle lamp module in the up-down direction is achieved. Moreover, as the second adjustable ball head connecting piece 1*c* is arranged directly behind the fixed ball head connecting piece 1*a* and the first adjustable ball head connecting piece 1*b*, the distance L' between the center of the ball head of the second adjustable ball head connecting piece 1*c* and the second rotation axis II may be increased, that is, a moment arm for the lighting unit 2 rotating in the up-down direction is increased, as shown in FIG. 12, and compared with the prior art, for a same moving distance of the second adjustable ball head connecting piece 1*c*, the dimming mechanism provided in the present disclosure achieves slighter rotation of the lighting unit 2 in the up-down direction, and thus the dimming precision in the up-down direction is higher. Meanwhile, as the first adjustable ball head connecting piece 1*b* is arranged on a side away from the fixed ball head connecting piece 1*a*, the distance between the center of the ball head of the first adjustable ball head connecting piece 1*b* and the first rotation axis I can be increased, that is, a moment arm for the lighting unit 2 rotating in the left-right direction is increased, and thus the dimming precision in the left-right direction is improved.

As a specific structural form of the present disclosure, the lighting unit 2 is provided with a sliding slot 4, and one end of the second adjustable ball head connecting piece 1*c* is slidably connected to the sliding slot 4 by a slider 6.

Specifically, as shown in FIGS. 19 to 25, and 33 to 36, the slider 6 includes a slider base 601 slidably connected to the sliding slot 4 and a fixed part 602 fixed on the slider base 601, and sliding parts 6011 are formed on two sides of the slider base 601, and the slider base 601 is slidably connected to the sliding slot 4 by the sliding parts 6011, so that the slider 6 can slide along the sliding slot 4. Here, the sliding slot 4 has a guiding function, and the sliding parts 6011 on the two sides of the slider 6 are inserted into the sliding slot 4 such that the slider 6 can be guided to slide in the direction of the sliding slot 4. The slider 6 shown in FIGS. 19 to 25, and 33 to 36 is provided with the fixed part 602 in two structural forms. The fixed part 602 can be movably connected to the ball head of the second adjustable ball head connecting piece 1c. In a first structural form, the fixed part 602 is formed as an annular structure, the second adjustable ball head connecting piece 1c includes a ball head screw 101 and a ball head nut 102, a clamping groove is formed in the ball head nut 102, and can be clamped into the annular structure so that the fixed part 602 is connected with the second adjustable ball head connecting piece 1c in a clamped manner, and the center of the ball head of the second adjustable ball head connecting piece 1c is arranged on an axial center line 6022 of the annular structure. The fixed part 602 is formed in a circular shape, a clamping groove is formed in the ball head nut 102 of the second adjustable ball head connecting piece 1c, and can be clamped into the circular-shaped fixed part 602 to achieve fixed connection between the second adjustable ball head connecting piece 1c and the fixed part 602, and the fixed part 602 may be surrounded by an annular table, which can limit jaws for forming the clamping groove in the ball head nut 102 and also protect the clamping groove. In addition, the fixed part 602 is formed as a circular shape, but bosses 6023 are formed on two sides of the fixed part 602, and extend along an axial direction of the fixed part 602, and upper parts of the bosses 6023 on the two sides are formed as open structures. The fixed part 602 with the above two structures is selected as needed in actual installation. In a second structural form, a cylindrical slot 6021 is formed in the fixed part 602, the second adjustable ball head connecting piece 1c is provided as a ball head screw 101, and the ball head of the second adjustable ball head connecting piece 1c is mounted in the cylindrical slot 6021 in a matching manner and can slide along the cylindrical slot 6021. It should be noted here that in the theoretical design state of the dimming mechanism, the center of the ball head of the second adjustable ball head connecting piece 1c is located on a vertical center plane of the slider 6, and vertical center planes of the slider 6, the sliding slot 4 and the lighting unit 2 coincide, and the axial center line 6022 of the cylindrical slot 6021 is perpendicular to a vertical plane passing through the center of the ball head of the fixed ball head connecting piece 1a and the center of the ball head of the second adjustable ball head connecting piece 1c, wherein the inner surface of the cylindrical slot 6021 is formed by stretching an intersecting line between the ball head of the second adjustable ball head connecting piece 1c and the vertical plane along the axial center line 6022. At this time, when dimming is performed in the left-right direction, as the slider 6 rotates along a track of an arc segment formed with the center of the ball head of the fixed ball head connecting piece 1a as a circle center and a connecting line between the center of the ball head of the fixed ball head connecting piece 1a and the center of the ball head of the second adjustable ball head connecting piece 1c as a radius, and the axial center line 6022 is a straight line, the ball head of the second adjustable ball head connecting piece 1c can only slide along the straight line relative to the cylindrical slot 6021, and thus there is still a certain stress between the ball head of the second adjustable ball head connecting piece 1c and the cylindrical slot 6021; or the axial center line 6022 of the cylindrical slot 6021 is formed as an arc segment with the center of the ball head of the fixed ball head connecting piece 1a as a circle center and a connecting line between the center of the ball head of the fixed ball head connecting piece 1a and the center of the ball head of the second adjustable ball head connecting piece 1c as a radius, wherein the inner surface of the cylindrical slot 6021 is formed by stretching an intersecting line between the ball head of the second adjustable ball head connecting piece 1c and a vertical plane along the axial center line 6022, and the vertical plane is a vertical plane passing through the center of the ball head of the fixed ball head connecting piece 1a and the center of the ball head of the second adjustable ball head connecting piece 1c. At this time, when dimming is performed in the left-right direction, the slider 6 rotates along the track of the above arc segment, and the relative sliding of the ball head of the second adjustable ball head connecting piece 1c and the cylindrical slot 6021 is also along the above arc segment, such that there is substantially no stress between the ball head of the second adjustable ball head connecting piece 1c and the cylindrical slot 6021, which is conducive to prolonging the service life of parts, but in consideration of the manufacturing cost of the parts and other reasons, a cylindrical slot 6021 whose axial center line 6022 is straight is preferred. The cylindrical slot 6021 is in tight fit with the ball head of the second adjustable ball head connecting piece 1c, which can not only ensure rotation of the ball head of the second adjustable ball head connecting piece 1c in the cylindrical slot 6021, but also ensure sliding of the ball head in the cylindrical slot 6021.

In addition, it can also be seen from the figures that an included angle is formed between a plane on the fixed part 602 attached to the clamping slot of the second adjustable ball head connecting piece 1c, and an upper or lower plane of the sliding parts 6011, and the sum of the included angle and the above included angle between the sliding slot 4 and the horizontal plane is 90°, which may also be understood as that an included angle is formed between the fixed part 602 and the slider base 601, and the sum of the included angle and the above included angle between the sliding slot 4 and the horizontal plane is 90°, to ensure that the second adjustable ball head connecting piece 1c extends horizontally.

Figure 29:
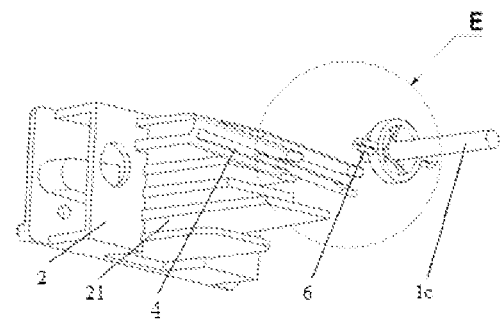
FIG. 29 is a structural schematic diagram III of the second specific embodiment of the dimming mechanism of the present disclosure.
Figure 30:
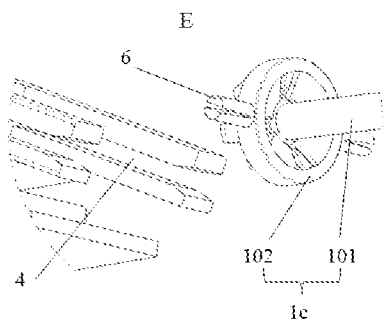
FIG. 30 is an enlarged diagram of a part E in FIG. 29.

Optionally, as shown in FIGS. 29 and 30, the slider 6 is formed as a sliding bar connected to the ball head nut 102, and the slider 6 can be slidably connected in the sliding slot 4. Thus, the structure of the sliding slot 4 may also be in the form of the structure shown in FIGS. 29 and 30 in addition to the structures shown in FIGS. 19 to 25, and 33 to 36, and at this time, the slider 6 slides in the sliding slot 4 and can also guide the second adjustable ball head connecting piece 1c to slide along the sliding slot 4. Of course, the cooperating structure of the slider 6 and the sliding slot 4 may also be in other structural forms, with the purpose of enabling the slider 6 to slide along the sliding slot 4, thereby enabling the second adjustable ball head connecting piece 1c to move forward and backward along the direction of the sliding slot 4, and the structural forms fall within the protection scope of the present disclosure.

As another specific structural form of the present disclosure, as shown in FIGS. 19 to 25, and 33 to 36, an elastic support structure 6012 is arranged on or integrally formed on one end surface, away from the fixed part 602, of the slider base 601, and the elastic support structure 6012 abuts against a bottom surface of the sliding slot 4 and is capable of generating an opposite acting force to enable the slider base 601 to be tightly attached to the sliding slot 4 and slide along the sliding slot 4.

Specifically, the elastic support structure 6012 is a pair of arc elastic sheets which extend in the direction of the sliding slot 4.

More specifically, one side edge of the elastic support structure 6012 is connected to a lower edge of the slider base 601. It may be understood that one side edge of the elastic support structure 6012 is connected to the lower edge of the slider base 601, and a gap is formed between the other side edge of the elastic support structure 6012 and the lower surface of the slider base 601, and meanwhile, the elastic support structure 6012 is of a curved structure bent downward. When the sliding part 6011 is inserted into the sliding slot 4, the sliding parts 6011 are tightly attached to the sliding slot 4 due to an elastic force of the elastic support structure 6012 without affecting the sliding of the sliding parts 6011 in the sliding slot 4. It should be noted here that the terms "upper" and "lower" here only denote current positions of the parts shown in FIGS. 21 to 25 and 33 to 36, and do not represent positions of the parts after actual installation.

In addition, an embodiment of the present disclosure further provides a vehicle lamp module, which includes the dimming mechanism in any of the above embodiments and a lighting unit 2.

To effectively use the internal space of the vehicle lamp module, the lighting unit 2 includes a heat sink 201, and a sliding slot 4 is integrally or detachably formed in the heat sink 201. Integral connection is preferred, which may reduce installation steps and reduce the difficulty of installation.

Furthermore, an embodiment of the present disclosure provides a vehicle lamp, which includes the vehicle lamp module in any of the above embodiments.

An embodiment of the present disclosure further provides a vehicle, which includes the vehicle lamp in the above embodiment.

The preferred embodiments of the present disclosure are described above in detail with reference to the accompanying drawings. However, the present disclosure is not limited to the specific details in the above embodiments. Within the scope of the technical concept of the present disclosure, various simple modifications may be made to the technical solutions of the present disclosure, and these simple modifications are all encompassed within the protection scope of the present disclosure.

Furthermore, it should be noted that the various specific technical features described in the above specific embodiments may be combined in any suitable manner without contradiction. To avoid unnecessary repetition, various possible combinations will not be described separately in the present disclosure.

In addition, optional combinations may be made to various different embodiments of the present disclosure, and the combinations should also be regarded as contents disclosed in the present disclosure so long as they do not depart from the idea of the present disclosure.

What is claimed is:

1. A dimming mechanism for dimming a lighting unit, comprising a fixed ball head connecting piece, a first adjustable ball head connecting piece and a second adjustable ball head connecting piece, wherein
    the fixed ball head connecting piece is connected to the lighting unit at one end and connected to a support frame or lamp body at another end;
    the first adjustable ball head connecting piece is connected to the lighting unit at one end and is supported on the support frame or lamp body at another end, and the first adjustable ball head connecting piece is capable of moving forward and backward relative to the support frame or lamp body to achieve dimming in a first direction by driving the lighting unit to rotate; and
    the lighting unit is provided with a sliding slot, and the second adjustable ball head connecting piece is slidably connected to the sliding slot at one end and is supported on the support frame or lamp body at another end, and the second adjustable ball head connecting piece is capable of moving forward and backward relative to the support frame or lamp body to drive the sliding slot to rotate and drive the lighting unit to rotate through the rotation of the sliding slot to achieve dimming in a second direction.

2. The dimming mechanism according to claim 1, wherein a connecting line between the center of a ball head of the fixed ball head connecting piece and the center of a ball head of the first adjustable ball head connecting piece extends in the first direction, and the second adjustable ball head connecting piece is arranged behind the fixed ball head connecting piece and the first adjustable ball head connecting piece;
    the first direction is an up-down direction, and the second direction is a left-right direction; and the center of the ball head of the fixed ball head connecting piece, the center of the ball head of the first adjustable ball head connecting piece and the center of a ball head of the second adjustable ball head connecting piece are placed in a same vertical plane, an included angle is formed between the sliding slot and the vertical plane; or
    the first direction is a left-right direction, and the second direction is an up-down direction; and the center of the ball head of the fixed ball head connecting piece, the center of the ball head of the first adjustable ball head connecting piece and the center of the ball head of the second adjustable ball head connecting piece are placed in a same horizontal plane, an included angle is formed between the sliding slot and the horizontal plane, and an included angle is formed between the sliding slot and the horizontal plane.

3. The dimming mechanism according to claim 1, wherein the fixed ball head connecting piece and the first adjustable ball head connecting piece are both ball head screw assemblies, and each of the ball head screw assemblies comprises a ball head screw and a ball head nut.

4. The dimming mechanism according to claim 1, wherein the sliding slot is formed in the lighting unit, a slider is arranged on the sliding slot, and one end of the second adjustable ball head connecting piece is slidably connected to the sliding slot by the slider, wherein the second adjustable ball head connecting piece is a ball head screw assembly, and the ball head screw assembly comprises a ball head screw and a ball head nut;
    the slider comprises a slider base slidably connected to the sliding slot and a fixed part fixed on the slider base, the fixed part can be movably connected to the ball head of the second adjustable ball head connecting piece; or,
    the slider is formed as a sliding bar connected to the ball head nut, and the slider can be slidably connected in the sliding slot.

5. The dimming mechanism according to claim 4, wherein the fixed part is formed as an annular structure, a clamping groove is formed in the second adjustable ball head connecting piece, the ball head nut of the second adjustable ball head connecting piece is clamped on the fixed part by the clamping groove, and the center of the ball head of the second adjustable ball head connecting piece is set on an axial center line of the annular structure; or
    a cylindrical slot is formed in the fixed part, the second adjustable ball head connecting piece is provided as a ball head screw, the ball head of the second adjustable ball head connecting piece is mounted in the cylindrical slot in a matching manner and can slide along the cylindrical slot.

6. The dimming mechanism according to claim 5, wherein the axial center line of the cylindrical slot is perpendicular to a vertical plane passing through the center of the ball head of the fixed ball head connecting piece and the center of the ball head of the second adjustable ball head connecting piece, wherein an inner surface of the cylindrical slot is formed by stretching an intersecting line between the ball head of the second adjustable ball head connecting piece and the vertical plane along the axial center line; or the axial center line of the cylindrical slot is formed as an arc segment with the center of the ball head of the fixed ball head connecting piece as a circle center and a connecting line between the center of the ball head of the fixed ball head connecting piece and the center of the ball head of the second adjustable ball head connecting piece as a radius, wherein the inner surface of the cylindrical slot is formed by stretching the intersecting line between the ball head of the second adjustable ball head connecting piece and the vertical plane along the axial center line, the vertical plane is a vertical plane passing through the center of the ball head of the fixed ball head connecting piece and the center of the ball head of the second adjustable ball head connecting piece.

7. The dimming mechanism according to claim 4, wherein an elastic support structure is arranged or integrally formed on one end surface, away from the fixed part, of the slider base, and the elastic support structure is a pair of arc elastic sheets which extend in a direction of the sliding slot, and the elastic support structure abuts against a bottom surface of the sliding slot and is capable of generating an opposite acting force to enable the slider base to be tightly attached to the sliding slot and slide along the sliding slot.

8. A vehicle lamp module, comprising the dimming mechanism according to claim 1.

9. The vehicle lamp module according to claim 8, wherein the lighting unit comprises a heat sink, and a sliding slot is integrally or detachably formed in the heat sink.

10. A vehicle lamp, comprising the vehicle lamp module according to claim 8.

11. The vehicle lamp module according to claim 8, wherein a connecting line between the center of a ball head of the fixed ball head connecting piece and the center of a ball head of the first adjustable ball head connecting piece extends in the first direction, and the second adjustable ball head connecting piece is arranged behind the fixed ball head connecting piece and the first adjustable ball head connecting piece;

the first direction is an up-down direction, and the second direction is a left-right direction; and the center of the ball head of the fixed ball head connecting piece, the center of the ball head of the first adjustable ball head connecting piece and the center of a ball head of the second adjustable ball head connecting piece are placed in a same vertical plane, an included angle is formed between the sliding slot and the vertical plane; or the first direction is a left-right direction, and the second direction is an up-down direction; and the center of the ball head of the fixed ball head connecting piece, the center of the ball head of the first adjustable ball head connecting piece and the center of the ball head of the second adjustable ball head connecting piece are placed in a same horizontal plane, an included angle is formed between the sliding slot and the horizontal plane, and an included angle is formed between the sliding slot and the horizontal plane.

12. The vehicle lamp module according to claim 8, wherein the sliding slot is formed in the lighting unit, a slider is arranged on the sliding slot, and one end of the second adjustable ball head connecting piece is slidably connected to the sliding slot by the slider, the second adjustable ball head connecting piece is a ball head screw assembly, the ball head screw assembly comprises a ball head screw and a ball head nut;

the slider comprises a slider base slidably connected to the sliding slot and a fixed part fixed on the slider base, the fixed part can be movably connected to the ball head of the second adjustable ball head connecting piece; or the slider is formed as a sliding bar connected to the ball head nut, and the slider can be slidably connected in the sliding slot.

13. The vehicle lamp module according to claim 12, wherein the fixed part is formed as an annular structure, a clamping groove is formed in the second adjustable ball head connecting piece, the ball head nut of the second adjustable ball head connecting piece is clamped on the fixed part by the clamping groove, and the center of the ball head of the second adjustable ball head connecting piece is set on an axial center line of the annular structure; or a cylindrical slot is formed in the fixed part, the second adjustable ball head connecting piece is provided as a ball head screw, the ball head of the second adjustable ball head connecting piece is mounted in the cylindrical slot in a matching manner and can slide along the cylindrical slot.

14. The vehicle lamp module according to claim 13, wherein the axial center line of the cylindrical slot is perpendicular to a vertical plane passing through the center of the ball head of the fixed ball head connecting piece and the center of the ball head of the second adjustable ball head connecting piece, wherein an inner surface of the cylindrical slot is formed by stretching an intersecting line between the ball head of the second adjustable ball head connecting piece and the vertical plane along the axial center line; or the axial center line of the cylindrical slot is formed as an arc segment with the center of the ball head of the fixed ball head connecting piece as a circle center and a connecting line between the center of the ball head of the fixed ball head connecting piece and the center of the ball head of the second adjustable ball head connecting piece as a radius, wherein the inner surface of the cylindrical slot is formed by stretching the intersecting line between the ball head of the second adjustable ball head connecting piece and the vertical plane along the axial center line, the vertical plane is a vertical plane passing through the center of the ball head of the fixed ball head connecting piece and the center of the ball head of the second adjustable ball head connecting piece.

15. The vehicle lamp module according to claim 12, wherein an elastic support structure is arranged or integrally formed on one end surface, away from the fixed part, of the slider base, and the elastic support structure is a pair of arc elastic sheets which extend in a direction of the sliding slot, and the elastic support structure abuts against a bottom surface of the sliding slot and is capable of generating an opposite acting force to enable the slider base to be tightly attached to the sliding slot and slide along the sliding slot.

16. The vehicle lamp according to claim 10, wherein a connecting line between the center of a ball head of the fixed ball head connecting piece and the center of a ball head of the first adjustable ball head connecting piece extends in the first direction, and the second adjustable ball head connecting piece is arranged behind the fixed ball head connecting piece and the first adjustable ball head connecting piece;

the first direction is an up-down direction, and the second direction is a left-right direction; and the center of the ball head of the fixed ball head connecting piece, the center of the ball head of the first adjustable ball head connecting piece and the center of a ball head of the second adjustable ball head connecting piece are placed in a same vertical plane, an included angle is formed between the sliding slot and the vertical plane; or the first direction is a left-right direction, and the second direction is an up-down direction; and the center of the ball head of the fixed ball head connecting piece, the center of the ball head of the first adjustable ball head connecting piece and the center of the ball head of the second adjustable ball head connecting piece are placed in a same horizontal plane, an included angle is formed between the sliding slot and the horizontal plane, and an included angle is formed between the sliding slot and the horizontal plane.

17. The vehicle lamp according to claim 10, wherein the sliding slot is formed in the lighting unit, a slider is arranged on the sliding slot, and one end of the second adjustable ball head connecting piece is slidably connected to the sliding slot by the slider, the second adjustable ball head connecting piece is a ball head screw assembly, the ball head screw assembly comprises a ball head screw and a ball head nut;

the slider comprises a slider base slidably connected to the sliding slot and a fixed part fixed on the slider base, the fixed part can be movably connected to the ball head of the second adjustable ball head connecting piece; or the slider is formed as a sliding bar connected to the ball head nut, and the slider can be slidably connected in the sliding slot.

18. The vehicle lamp according to claim 17, wherein the fixed part is formed as an annular structure, a clamping groove is formed in the second adjustable ball head connecting piece, the ball head nut of the second adjustable ball head connecting piece is clamped on the fixed part by the clamping groove, and the center of the ball head of the second adjustable ball head connecting piece is set on an axial center line of the annular structure; or a cylindrical slot is formed in the fixed part, the second adjustable ball head connecting piece is provided as a ball head screw, the ball head of the second adjustable ball head connecting piece is mounted in the cylindrical slot in a matching manner and can slide along the cylindrical slot.

19. The vehicle lamp according to claim 18, wherein the axial center line of the cylindrical slot is perpendicular to a vertical plane passing through the center of the ball head of the fixed ball head connecting piece and the center of the ball head of the second adjustable ball head connecting piece, wherein an inner surface of the cylindrical slot is formed by stretching an intersecting line between the ball head of the second adjustable ball head connecting piece and the vertical plane along the axial center line; or the axial center line of the cylindrical slot is formed as an arc segment with the center of the ball head of the fixed ball head connecting piece as a circle center and a connecting line between the center of the ball head of the fixed ball head connecting piece and the center of the ball head of the second adjustable ball head connecting piece as a radius, wherein the inner surface of the cylindrical slot is formed by stretching the intersecting line between the ball head of the second adjustable ball head connecting piece and the vertical plane along the axial center line, the vertical plane is a vertical plane passing through the center of the ball head of the fixed ball head connecting piece and the center of the ball head of the second adjustable ball head connecting piece.

20. The vehicle lamp according to claim 17, wherein an elastic support structure is arranged or integrally formed on one end surface, away from the fixed part, of the slider base, and the elastic support structure is a pair of arc elastic sheets which extend in a direction of the sliding slot, and the elastic support structure abuts against a bottom surface of the sliding slot and is capable of generating an opposite acting force to enable the slider base to be tightly attached to the sliding slot and slide along the sliding slot.

* * * * *